United States Patent
Burr et al.

(10) Patent No.: US 10,410,394 B2
(45) Date of Patent: Sep. 10, 2019

(54) METHODS AND SYSTEMS FOR 3D ANIMATION UTILIZING UVN TRANSFORMATION

(71) Applicant: Blue Sky Studios, Inc., Greenwich, CT (US)

(72) Inventors: Adam Burr, Suffern, NY (US); Steve Gressak, Ridgefield, CT (US); Christian Haniszewski, Kearny, NJ (US); Ignacio Barrios, Mount Krisco, NY (US); Brian Anderson, Katonah, NY (US); Ferris Webby, North Salem, NY (US)

(73) Assignee: BLUE SKY STUDIOS, INC., Greenwich, CT (US)

( * ) Notice: Subject to any disclaimer, the term of this patent is extended or adjusted under 35 U.S.C. 154(b) by 0 days.

(21) Appl. No.: 15/558,330

(22) PCT Filed: Mar. 17, 2016

(86) PCT No.: PCT/US2016/022756
§ 371 (c)(1),
(2) Date: Sep. 14, 2017

(87) PCT Pub. No.: WO2016/149444
PCT Pub. Date: Sep. 22, 2016

(65) Prior Publication Data
US 2018/0068481 A1    Mar. 8, 2018

Related U.S. Application Data

(60) Provisional application No. 62/134,220, filed on Mar. 17, 2015.

(51) Int. Cl.
G06T 13/40 (2011.01)
G06T 7/149 (2017.01)
G06T 17/20 (2006.01)

(52) U.S. Cl.
CPC .............. G06T 13/40 (2013.01); G06T 7/149 (2017.01); G06T 17/20 (2013.01); *G06T 2200/04* (2013.01); *G06T 2219/021* (2013.01)

(58) Field of Classification Search
None
See application file for complete search history.

(56) References Cited

U.S. PATENT DOCUMENTS 7,643,026 B2    1/2010  Chai et al.
7,944,443 B1 *  5/2011  Milliron .................. G06T 17/30
                                            345/419

(Continued)

OTHER PUBLICATIONS

International Application No. PCT/US2016/022756 International Preliminary Report on Patentability, dated Sep. 28, 2017, 7 pages.

(Continued)

*Primary Examiner* — Jeffrey J Chow
(74) *Attorney, Agent, or Firm* — Cantor Colburn LLP

(57) ABSTRACT

A system and method for 3D animation utilizing UVN transformation includes generation of head meshes in Cartesian space, transformation of head mesh vertices into UVN coordinate space, mapping of vertices to their closest UV coordinates on the surface, with signed distances becoming their N coordinates, sculpting flattened, square UVN meshes, transforming said meshes back to Cartesian space by evaluating the parameterized surface at the new UV coordinates, and scaling surface normal by the new N coordinate and adding to the surface positions.

48 Claims, 21 Drawing Sheets

(56) References Cited

U.S. PATENT DOCUMENTS

| | | |
|---|---|---|
| 8,482,569 B2 | 7/2013 | Derose et al. |
| 2002/0041285 A1 | 4/2002 | Hunter et al. |
| 2008/0266292 A1* | 10/2008 | Gornowicz ............ G06T 19/00 345/423 |
| 2011/0304622 A1 | 12/2011 | Rogers et al. |
| 2014/0267306 A1* | 9/2014 | Koniaris ................ G06T 13/20 345/473 |
| 2015/0325044 A1* | 11/2015 | Lebovitz ................ G06T 15/04 345/420 |

OTHER PUBLICATIONS

International Application No. PCT/US2016/022756 International Search Report and Written Opinion dated Jul. 5, 2016, 10 pages.

* cited by examiner

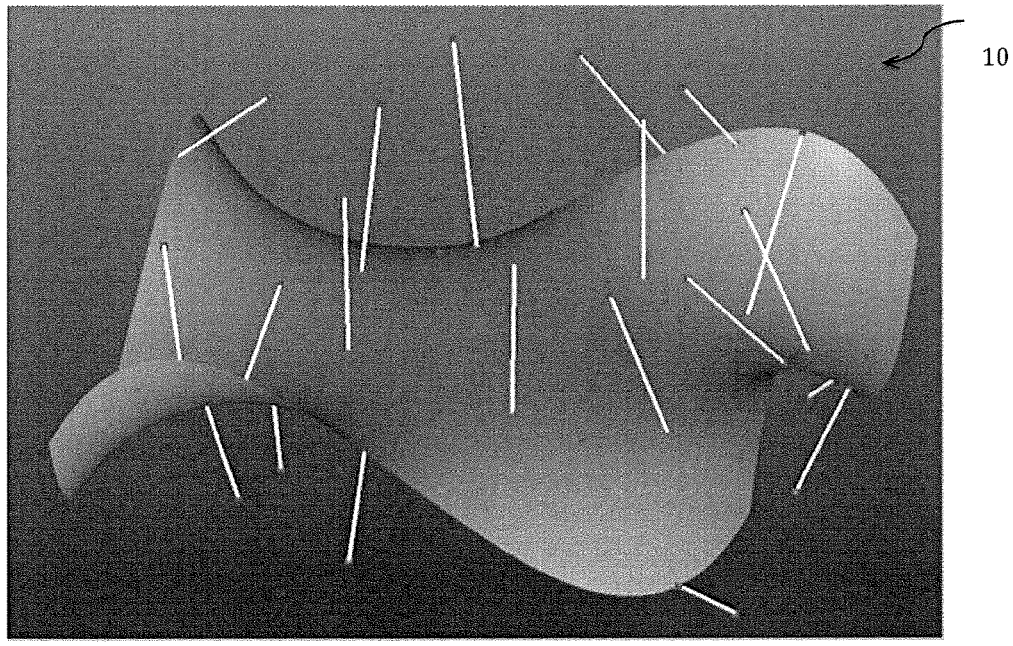
PRIOR ART FIGURE 1
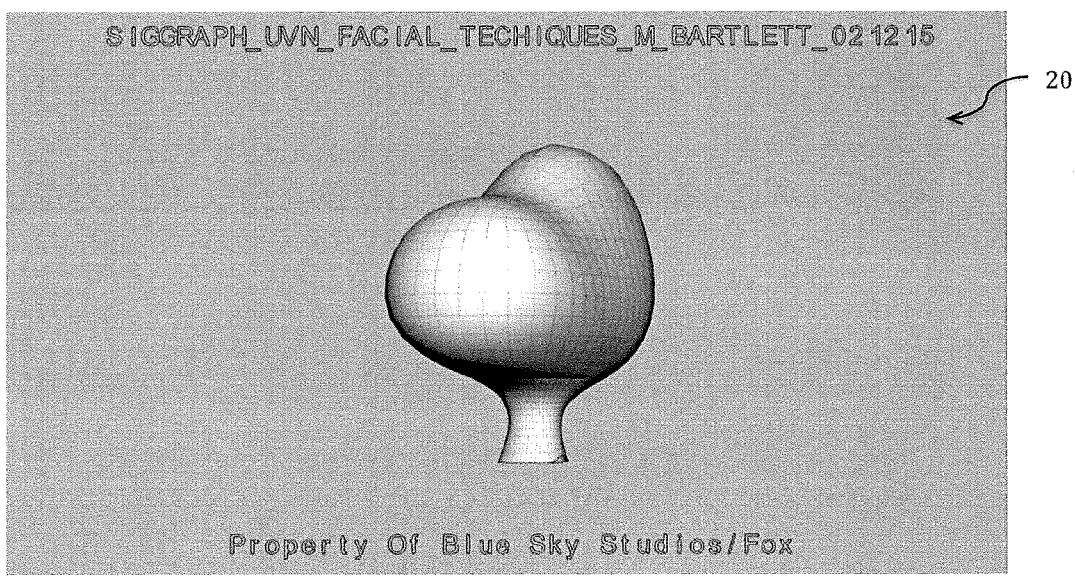
FIGURE 2

METHODS AND SYSTEMS FOR 3D ANIMATION UTILIZING UVN TRANSFORMATION

TECHNICAL FIELD

The present invention is generally related to computer animation. More particularly, example embodiments of the present invention are directed to methods and systems for providing three-dimensional (3D) animation.

BACKGROUND OF THE INVENTION

Conventionally, motion picture production includes recording live-action footage and preparation of the footage for distribution. In contrast, conventional computer animation includes complex modeling of physical representations of objects/characters to be recorded, computer-interpretation of those models, and frame-by-frame rendering of movements of those models to mimic live-action recording of conventional movies. Thereafter, background features are added and post-processing may occur to render sharp detail.

To achieve 3D animation tasks are inherently more complex and there is a need in the art to provide methods and systems for 3D animation that reduce the complexity of animation while also increasing final quality.

One aspect of 3D animation relates to surface distortions and volume loss due to linear interpolation between character shape changes, e.g., facial expressions. The problems arise during 3D animation when modeling transitions are attempted in 3D space while attempting to remain faithful to an original character's style and design. This can be particularly challenging when the characters undergo extreme transitions, for example with regards to the Peanuts characters, with the tiny, pinched mouths, ear to ear smiles, exaggerated screams and expressions that are stretched to great extremes, all in an attempt to preserve the clean profiles and smooth shadings of their round heads.

Common 3D animation methods include traditional blend shape methods. One useful source on blend shape methods may be found at http://www.creativeblog.com/maya/how-animate-character-blend-shapes-10134835, the entirety of which is incorporated herein by reference. The article describes such methodology in the context of a common software suite by the name of Maya, which methodology is a type of deformer tool therein. As is stated by that article, "Blend shapes create the illusion that one shape changes into another in a natural-looking way. You might use one, for example, to animate a character's mouth moving from a neutral shape into a smile. This works by using a duplicated version of the object, which is then manually adjusted to another shape. You can then use blend shapes to blend or morph between these, and it creates the illusion of an object changing its form."

However, such traditional methods cause surface distortions and volume loss due to linear interpolation during transitions (e.g., between expressions). What are needed in the art are new systems and methods that preserve and control (e.g., head) shapes while allowing (e.g., facial) features to slide freely around those curved volumes.

SUMMARY

The above problems and disadvantages of the prior art are overcome and alleviated by the present system and method for 3D animation, including establishing animation character shape mesh vertices in Cartesian space; and transforming such vertices into a UVN coordinate space defined by a parameterized surface built into each shape. Certain exemplary embodiments relate to head mesh vertices, wherein a parameterized surface is built into each head. Additionally, in exemplary embodiments, the parameterized surface is a NURBS surface.

In exemplary embodiments, the vertices are mapped to their closest UV coordinates on the surface, with the signed distances of the vertices becoming the N coordinates of the vertices. In further exemplary embodiments, UVN meshes are presented back in the animation interface to be sculpted and deformed (hereinafter "sculpting" and "deforming" will be simply referred to as "deforming" or "deformation"). In exemplary embodiments, the UVN meshes that are presented back in the animation are flattened, square UVN meshes.

In other exemplary embodiments, techniques for deforming animation include techniques utilized by in an interface from a separate software suite, e.g. Maya software. In further exemplary embodiments, techniques for deforming animation include linear blending. In exemplary embodiments, the transformation from Cartesian space to UVN coordinate space is provided via a plugin software application relative to a third party software, e.g., Maya.

In exemplary embodiments, after deformation, the meshes are transferred back to Cartesian space by evaluating the parameterized surface at the new UV coordinates. In further exemplary embodiments, the surface normals of vertices are scaled by the new N coordinate and added to the surface positions.

In exemplary embodiments, e.g., linear vertex translations in UVN space becomes volume preserving curved paths in Cartesian space that can be controlled by underlying parameterized surfaces.

In other exemplary embodiments, a system incorporating some or all of the above further includes a computer apparatus, a means for display in communication with the computer apparatus, and a means for storage in communication with the computer apparatus. The means for storage is disposed to store data representing a 3D animation, the means for display is disposed to display a representation of the 3D animation, and the computer apparatus is configured to perform a method of 3D animation.

According to yet another example embodiment of the present invention, a computer program product for 3D animation includes a tangible storage medium readable by a computer processor and storing instructions thereon that, when executed by the computer processor, direct the computer processor to perform a method in accordance with some or all of the above.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Furthermore, each drawing contained in this provisional application includes at least a brief description thereon and associated text labels further describing associated details. The FIGURES:

PRIOR ART FIG. 1 depicts a graph illustrating exemplary point projection on a NURBS curve;

FIG. 2 illustrates a screen shot of an exemplary Snoopy head in a first state;

DETAILED DESCRIPTION

Figure 3:
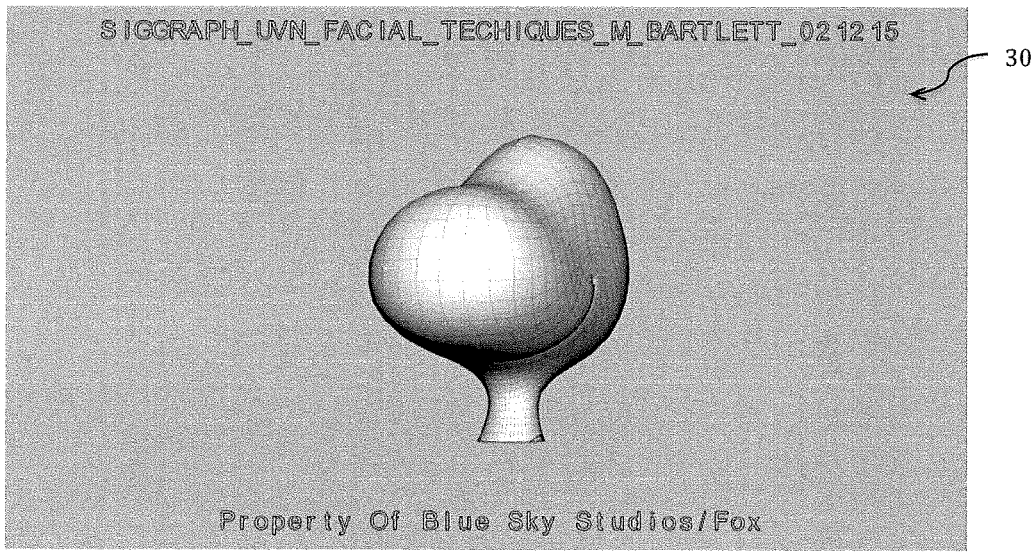
FIG. 3 illustrates a screen shot of an exemplary Snoopy head in a second, deformed state relative to the first state of FIG. 2.

Further to the brief description provided above and associated textual detail of each of the figures, the following description provides additional details of example embodiments of the present invention.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. As we have noted above, the present disclosure relates to systems and methods for 3D animation, including establishing animation character shape mesh vertices in Cartesian space; and transforming such vertices into a UVN coordinate space defined by a parameterized surface. One non-limiting example of a (preferably smooth) parameterized surface is a non-uniform rational basis spline ("NURBS") surface, which is a known mathematical model used in computer graphics for representing curves and surfaces (as functions of two parameters mapping to a surface in three-dimensional space) built into each shape. In the following exemplary embodiments, we will describe NURBS surfaces, with the understanding that the present disclosure encompasses other types of parameterized surfaces. Additionally, certain exemplary embodiments relate to head mesh vertices, wherein a NURBS surface is built into each head.

As we have described above, the present disclosure advantageously recognizes that deformation of surfaces after UVN transformation avoids or minimizes surface distortions and volume loss due to linear interpolation during transitions (e.g., between expressions). In other words, linear vertex translations in UVN space advantageously became volume preserving curved paths in Cartesian space that could be controlled by underlying parameterized, e.g., NURBS, surfaces.

In exemplary embodiments, the vertices are mapped to their closest UV coordinates on the surface, with the signed distances of the vertices becoming the N coordinates of the vertices. Transformation, as used herein, refers to re-parameterization, morphism or mapping that leaves structure in place. An exemplary reference may be found at http://en.wikipedia.org/wiki/Morphism (attached hereto) for a general discussion of morphism, the entire contents of which are incorporated herein by reference. Additionally, reference is made to http://en.wikipedia.org/wiki/Geometric_transformation (attached hereto), which describes "[a] geometric transformation is any bijection of a set having some geometric structure to itself or another such set" and states, "A geometric transformation is a function whose domain and range are sets of points." That document is also incorporated by reference herein.

In exemplary embodiments of the present disclosure, each of the vertices is transformed to UVN coordinate space, e.g., via the method(s) described in http://www.renishaw.com/geometricmodelling/en/nurbs-point-inversion-and-projection-19941 (attached hereto), the entire contents of which are incorporated herein by reference, which methodolog. PRIOR ART FIG. 1 is drawn from that reference, generally illustrating a point projection technique, which illustrates point projection on a NURBS surface. Additionally, that article describes point inversion, which finds parameters U and V corresponding to a point on or near a curve or surface. While this last reference relates to particular software called "GML," it should be understood that this is merely one, non-limiting example of point projection implementation.

In further exemplary embodiments, UVN meshes are presented back in the animation interface to be sculpted and deformed (hereinafter "sculpting" and "deforming" will be simply referred to as "deforming" or "deformation"). In exemplary embodiments, the UVN meshes that are presented back in the animation are flattened, square UVN meshes.

In other exemplary embodiments, techniques for deforming animation include techniques utilized by in an interface from a separate software suite, e.g. Maya software. In further exemplary embodiments, techniques for deforming animation include linear blending. In exemplary embodiments, the transformation from Cartesian space to UVN coordinate space is provided via a plugin software application relative to third party software, e.g., Maya.

In exemplary embodiments, after deformation, the meshes are transferred back to Cartesian space by evaluating the NURBS surface at the new UV coordinates. In further exemplary embodiments, the surface normals of vertices are scaled by the new N coordinate and added to the surface positions.

In exemplary embodiments, e.g., linear vertex translations in UVN space becomes volume preserving curved paths in Cartesian space that can be controlled by underlying NURBS surfaces.

Figure 4:
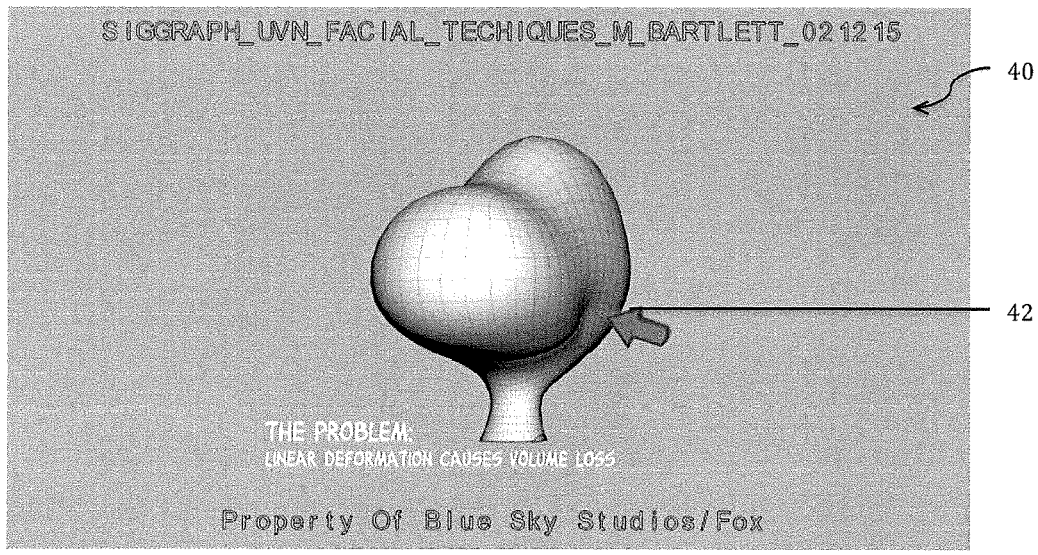
FIG. 4 illustrates a screen shot of an exemplary Snoopy head, with illustrated deformation showing the linear deformation cause of volume loss.

Reference is made to FIGS. 2-35, which show examples of such UVN transformation. FIGS. 2-9 illustrate problems with deformation in Cartesian space (FIGS. 2-4) recognized by the current invention, with UVN transform solutions (FIGS. 5-9) for preservation of volume. FIG. 2 illustrates an exemplary Snoopy head generally at 20 in a first state. FIG. 3 illustrates an exemplary Snoopy head generally at 30 in a second, deformed state relative to the first state of FIG. 2. FIG. 4 illustrates an exemplary Snoopy head generally at 40, with illustrated deformation at 42 showing the linear deformation cause of volume loss.

Figure 5:
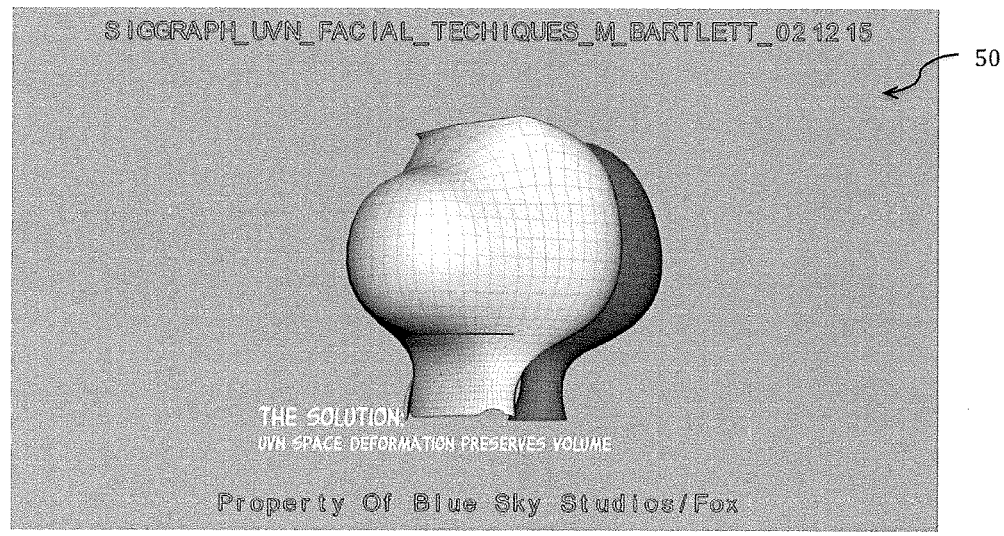
FIG. 5 illustrates a screen shot of an exemplary Snoopy head mesh utilizing UVN space deformation techniques that preserve volume.
Figure 6:
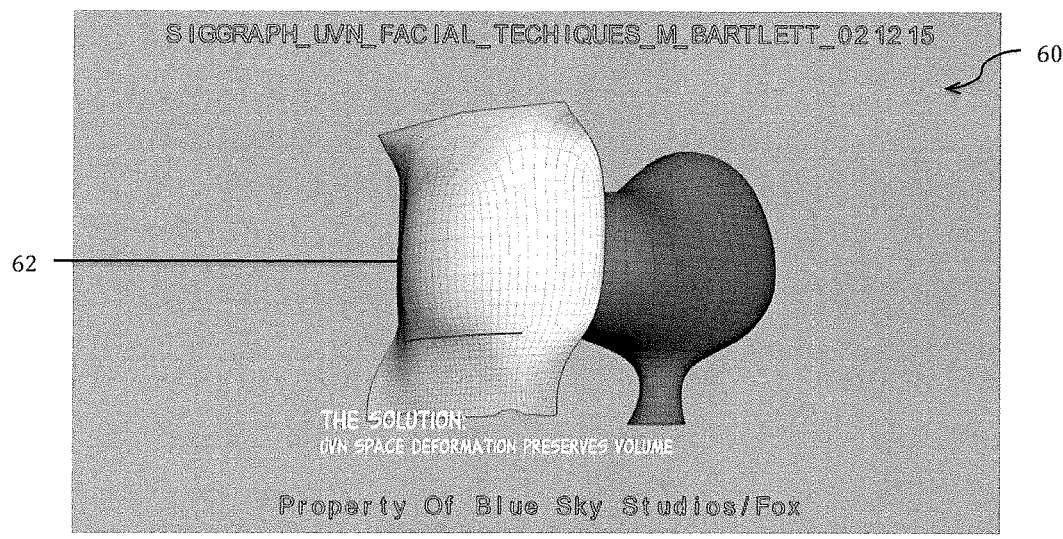
FIG. 6 illustrates a screen shot of an exemplary head of Snoopy with a head mesh transitioning to an exemplary flattened, square configuration for a UVN map.
Figure 7:
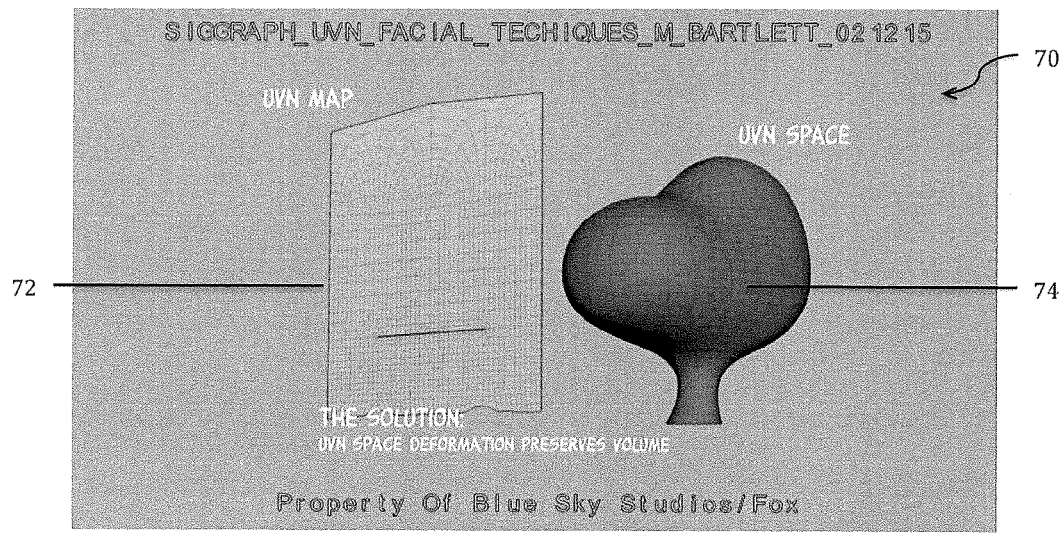
FIG. 7 illustrates a screen shot of an exemplary Snoopy head, with a square, flattened head mesh as a UVN map relative to UVN space.
Figure 8:
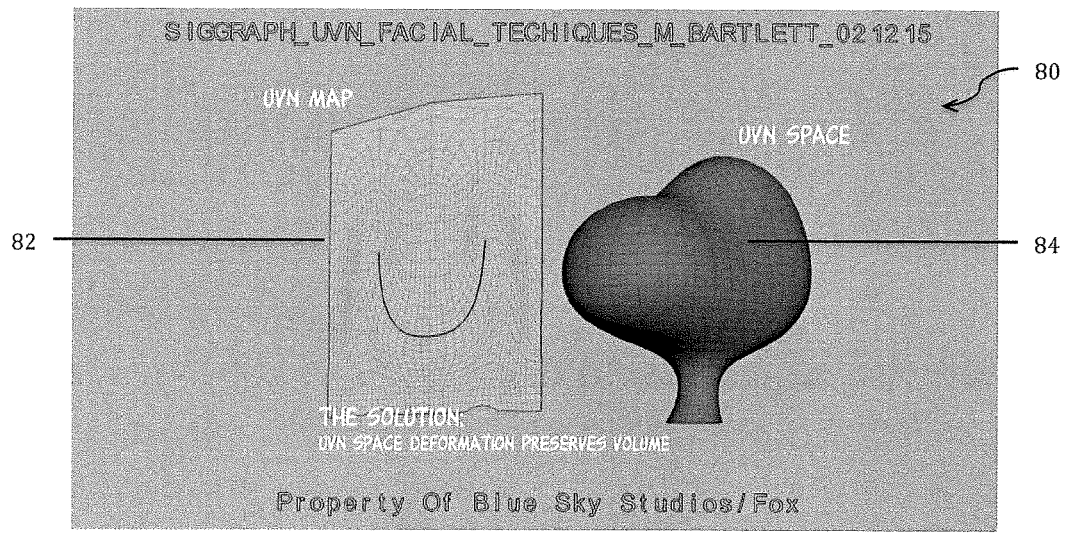
FIG. 8 illustrates a screen shot of an exemplary Snoopy head, with a now deformed square, flattened head mesh as a UVN map relative to UVN space.
Figure 9:
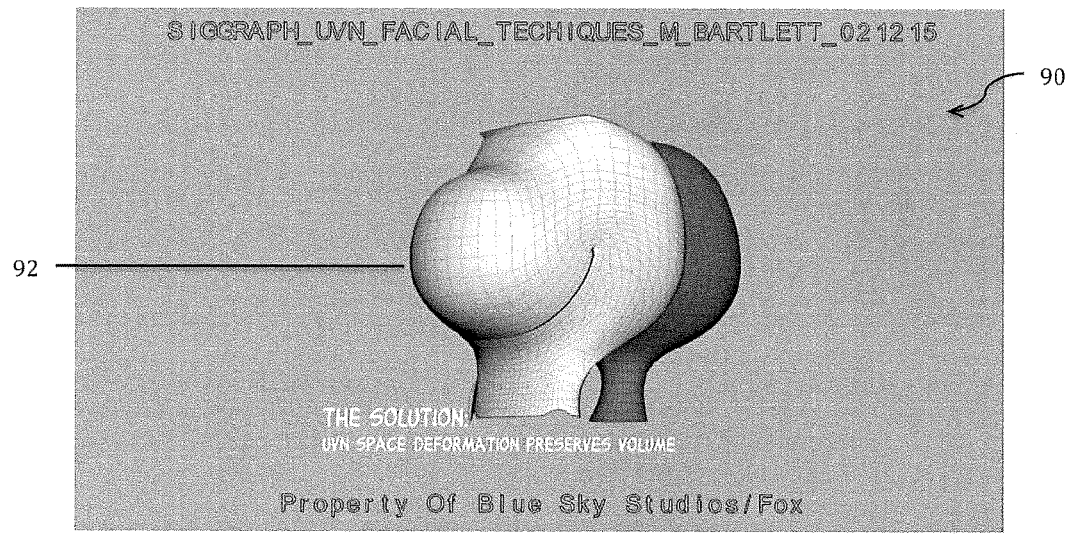
FIG. 9 illustrates a screen shot of an exemplary Snoopy head, with the deformed head mesh being transferred back to Cartesian space.

FIG. 5 illustrates an exemplary Snoopy head mesh generally at 50 utilizing UVN space deformation techniques that preserve volume. FIG. 6 illustrates an exemplary head of Snoopy, shown generally at 60, with a head mesh 62 transitioning to an exemplary flattened, square configuration for a UVN map. FIG. 7 illustrates an exemplary Snoopy head generally at 70, with a square, flattened head mesh 72 as a UVN map relative to UVN space 74. FIG. 8 illustrates an exemplary Snoopy head generally at 80, with a now deformed square, flattened head mesh 82 as a UVN map relative to UVN space 84. FIG. 9 illustrates an exemplary Snoopy head generally at 90, with the deformed head mesh 92 being transferred back to Cartesian space.

Figure 10:
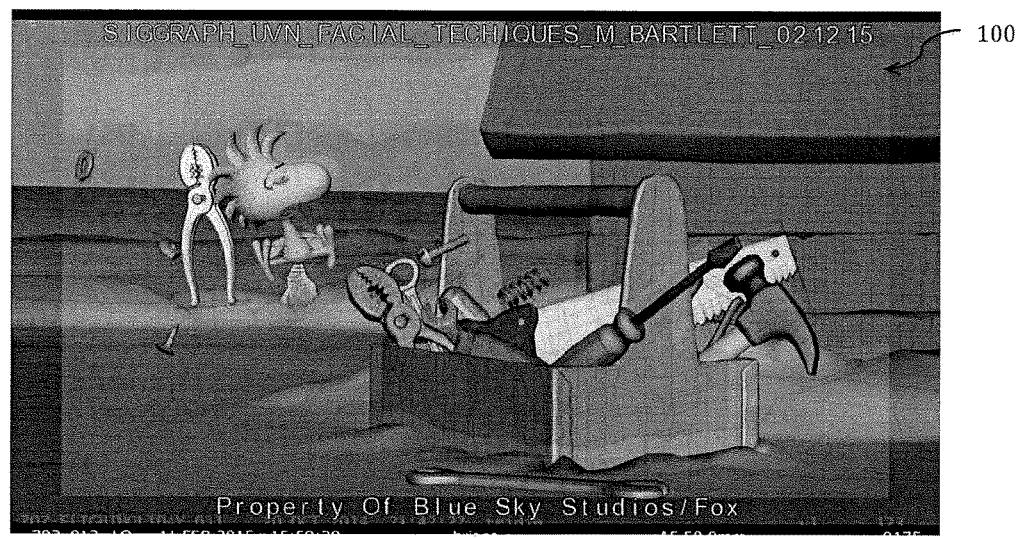
FIG. 10 illustrates a screen shot of an exemplary Woodstock character for UVN transformation.
Figure 11:
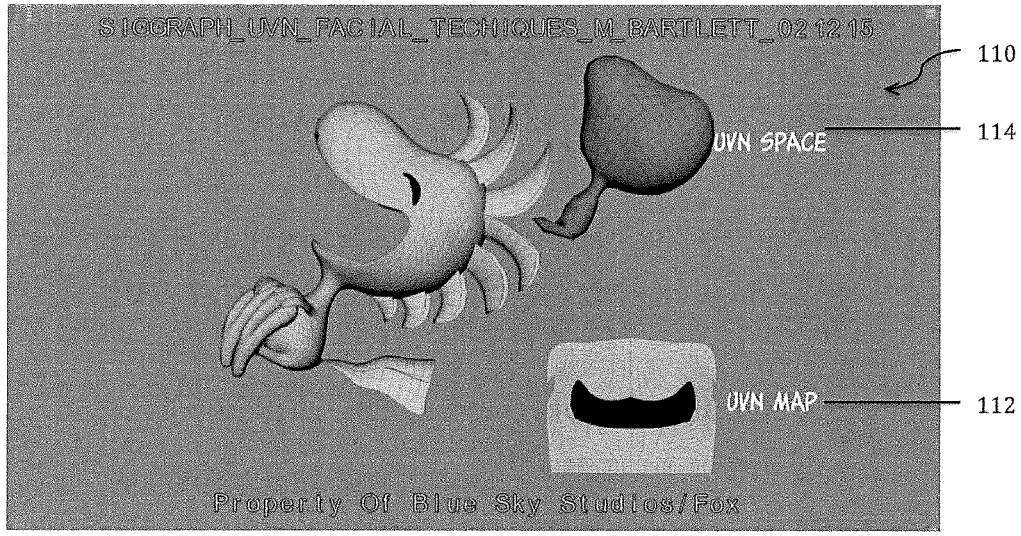
FIG. 11 illustrates a screen shot of an exemplary Woodstock character in a first deformed state via UVN transformation, with corresponding UVN map at and UVN space.
Figure 12:
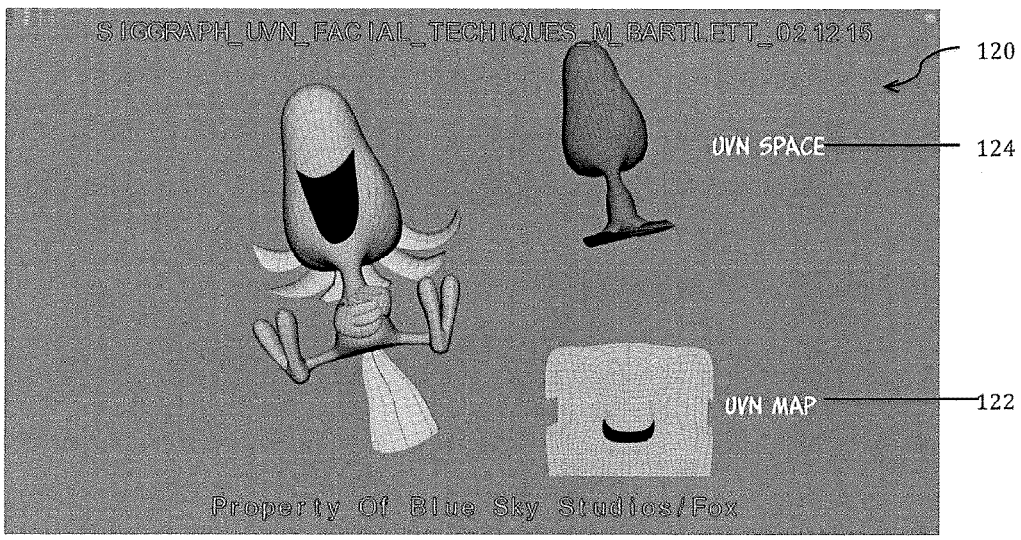
FIG. 12 illustrates a screen shot of an exemplary Woodstock character in a second deformed state via UVN transformation, with corresponding UVN map and UVN space.
Figure 13:
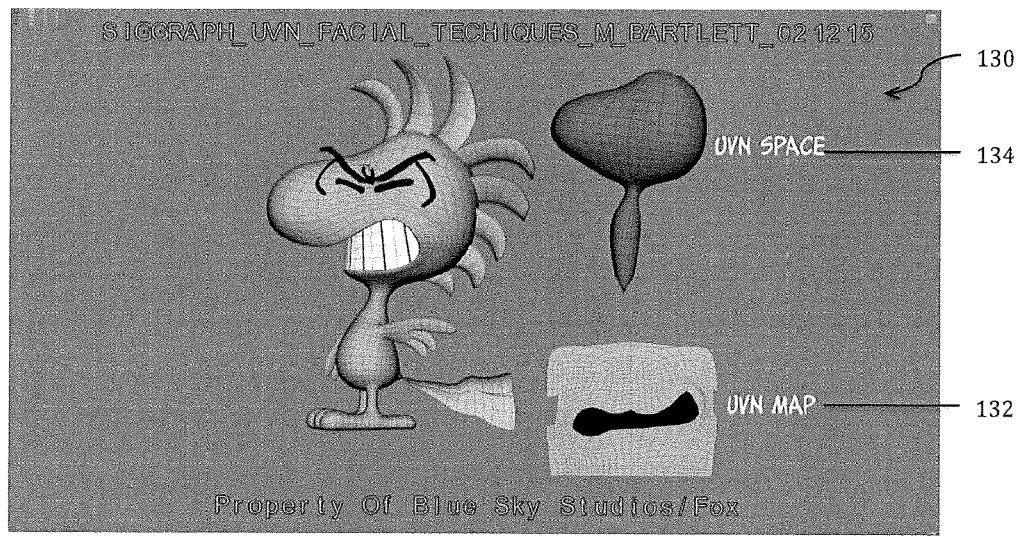
FIG. 13 illustrates a screen shot of an exemplary Woodstock character in a third deformed state via UVN transformation, with corresponding UVN map and UVN space.

FIG. 10 illustrates generally at 100 an exemplary Woodstock character for UVN transformation. FIG. 11 illustrates an exemplary Woodstock character 110 in a first deformed state via UVN transformation, with corresponding UVN map at 112 and UVN space at 114. FIG. 12 illustrates an exemplary Woodstock character 120 in a second deformed state via UVN transformation, with corresponding UVN map at 122 and UVN space at 124. FIG. 13 illustrates an exemplary Woodstock character 130 in a third deformed state via UVN transformation, with corresponding UVN map at 132 and UVN space at 134.

Figure 14:
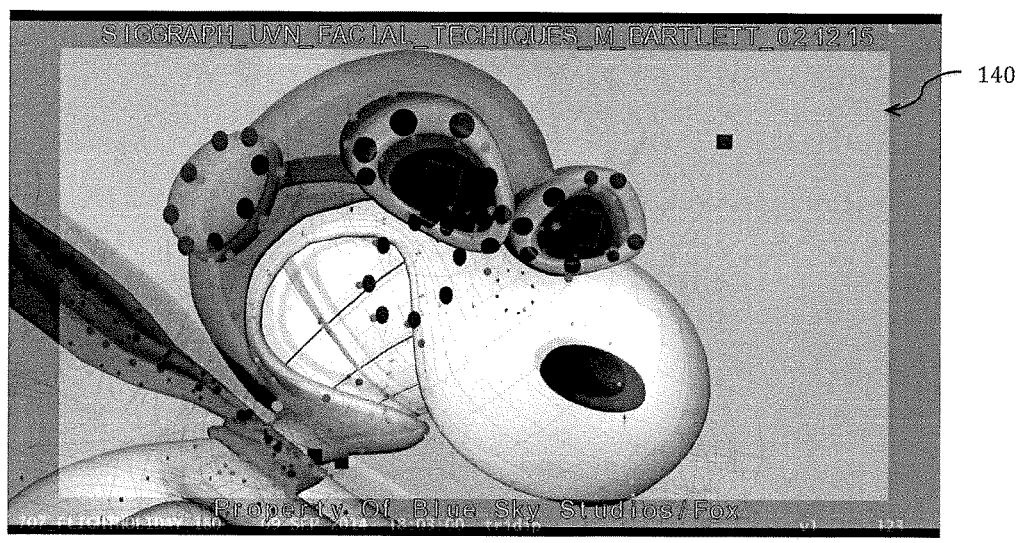
FIG. 14 illustrates a screen shot of an exemplary Snoopy character for UVN transformation.
Figure 15:
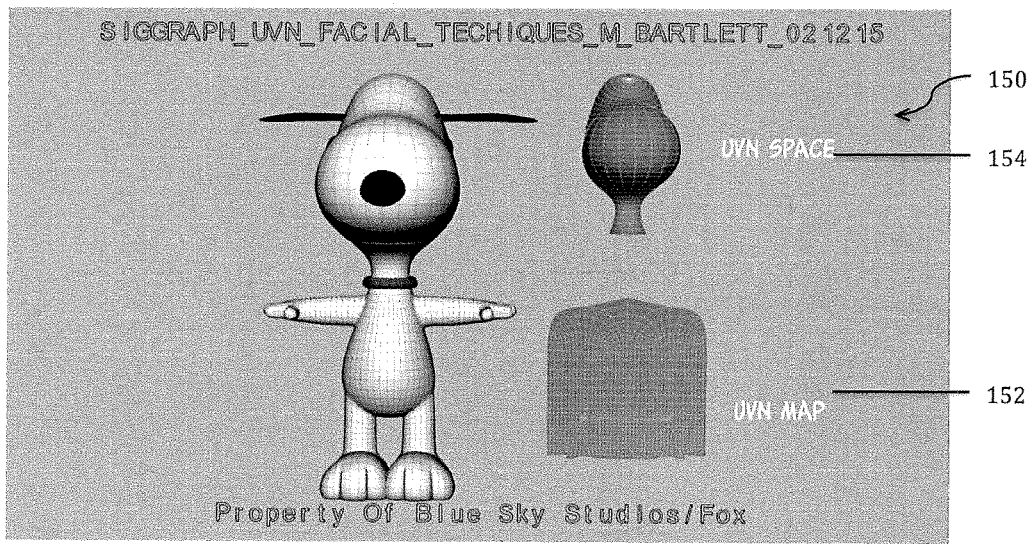
FIG. 15 illustrates a screen shot of an exemplary Snoopy character in an initial un-deformed state during UVN transformation, with corresponding UVN map and UVN space.
Figure 16:
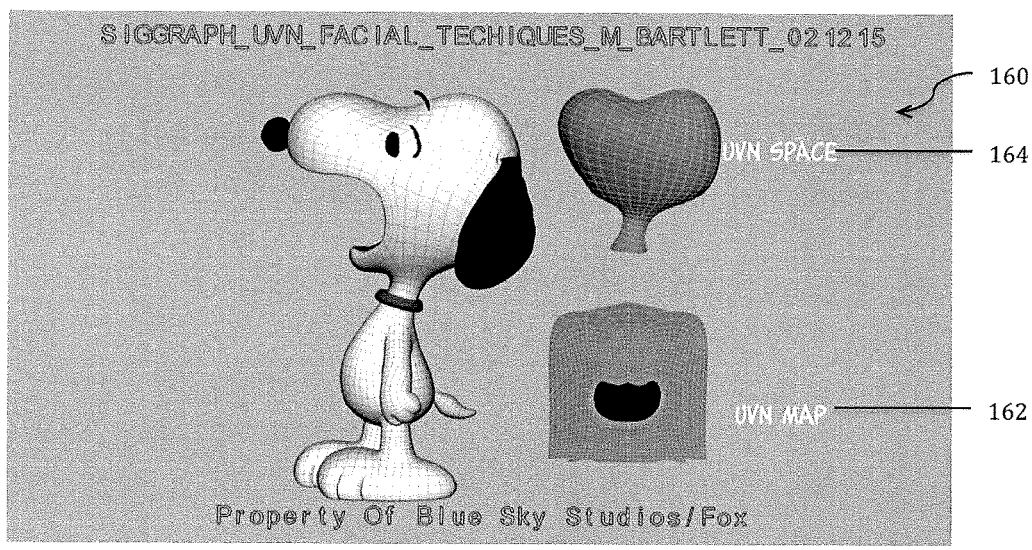
FIG. 16 illustrates a screen shot of an exemplary Snoopy character in a first deformed state via UVN transformation, with corresponding UVN map and UVN space.
Figure 17:
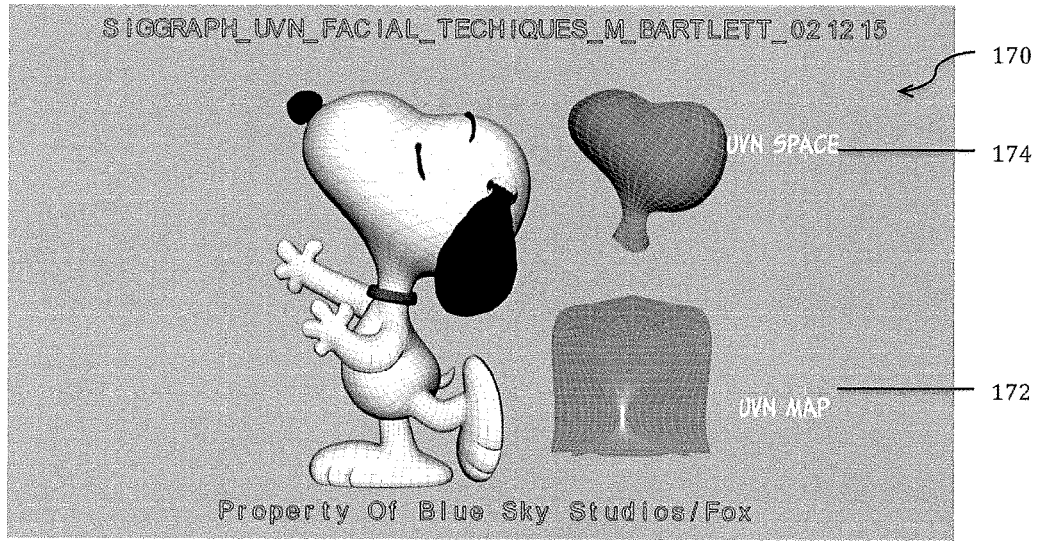
FIG. 17 illustrates a screen shot of an exemplary Snoopy character in a second deformed state via UVN transformation, with corresponding UVN map and UVN space.
Figure 18:
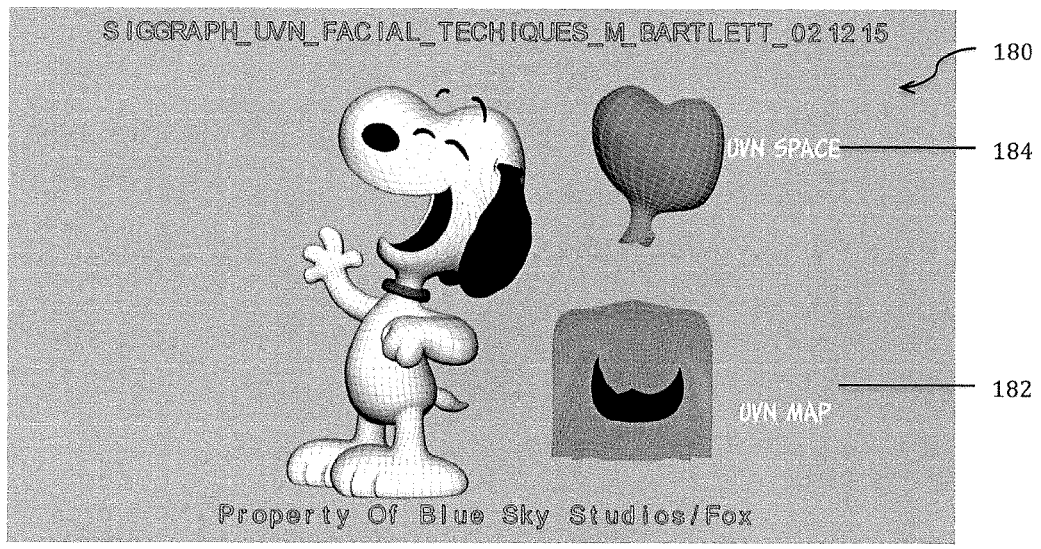
FIG. 18 illustrates a screen shot of an exemplary Snoopy character in a second deformed state via UVN transformation, with corresponding UVN map and UVN space.

FIG. 14 illustrates generally at 140 an exemplary Snoopy character for UVN transformation. FIG. 15 illustrates an exemplary Snoopy character 150 in an initial un-deformed state during UVN transformation, with corresponding UVN map at 152 and UVN space at 154. FIG. 16 illustrates an exemplary Snoopy character 160 in a first deformed state via UVN transformation, with corresponding UVN map at 162 and UVN space at 164. FIG. 17 illustrates an exemplary Snoopy character 170 in a second deformed state via UVN transformation, with corresponding UVN map at 172 and UVN space at 174. FIG. 18 illustrates an exemplary Snoopy character 180 in a second deformed state via UVN transformation, with corresponding UVN map at 182 and UVN space at 184.

Figure 19:
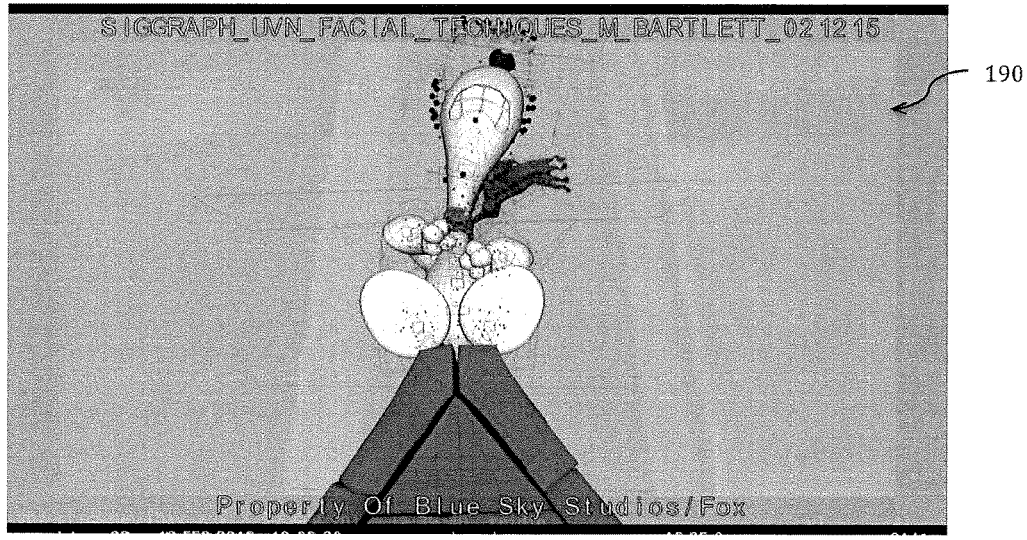
FIG. 19 illustrates a screen shot of an exemplary Snoopy character for UVN transformation.
Figure 20:
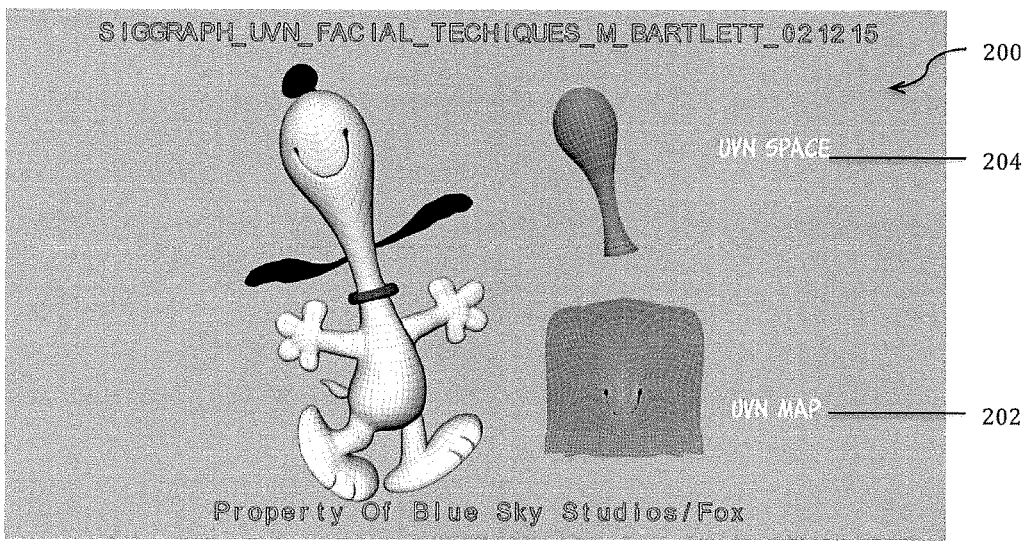
FIG. 20 illustrates a screen shot of an exemplary Snoopy character in a first deformed state via UVN transformation, with corresponding UVN map and UVN space.
Figure 21:
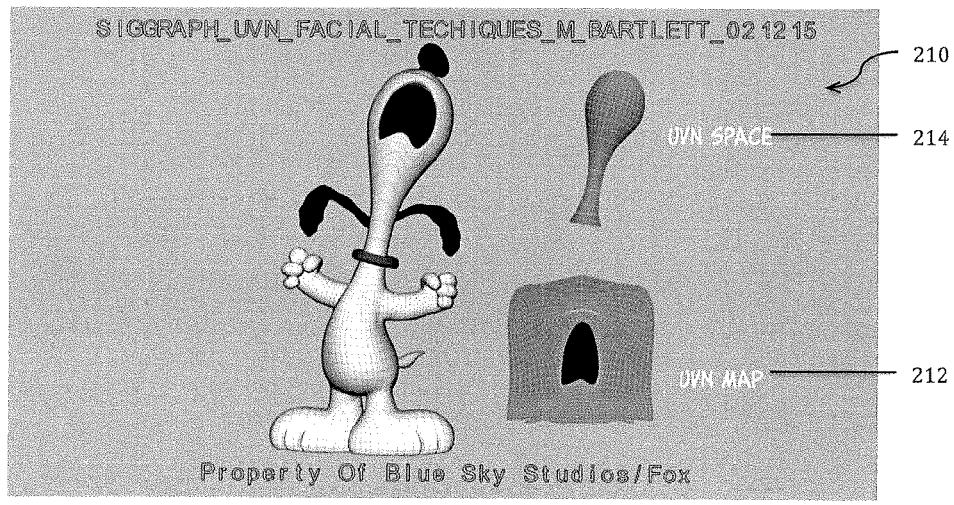
FIG. 21 illustrates a screen shot of an exemplary Snoopy character in a second deformed state via UVN transformation, with corresponding UVN map and UVN space.

FIG. 19 illustrates generally at 190 an exemplary Snoopy character for UVN transformation. FIG. 20 illustrates an exemplary Snoopy character 200 in a first deformed state via UVN transformation, with corresponding UVN map at 202 and UVN space at 204. FIG. 20 illustrates an exemplary Snoopy character 200 in a first deformed state via UVN transformation, with corresponding UVN map at 202 and UVN space at 204. FIG. 21 illustrates an exemplary Snoopy character 210 in a second deformed state via UVN transformation, with corresponding UVN map at 212 and UVN space at 214.

Figure 22:
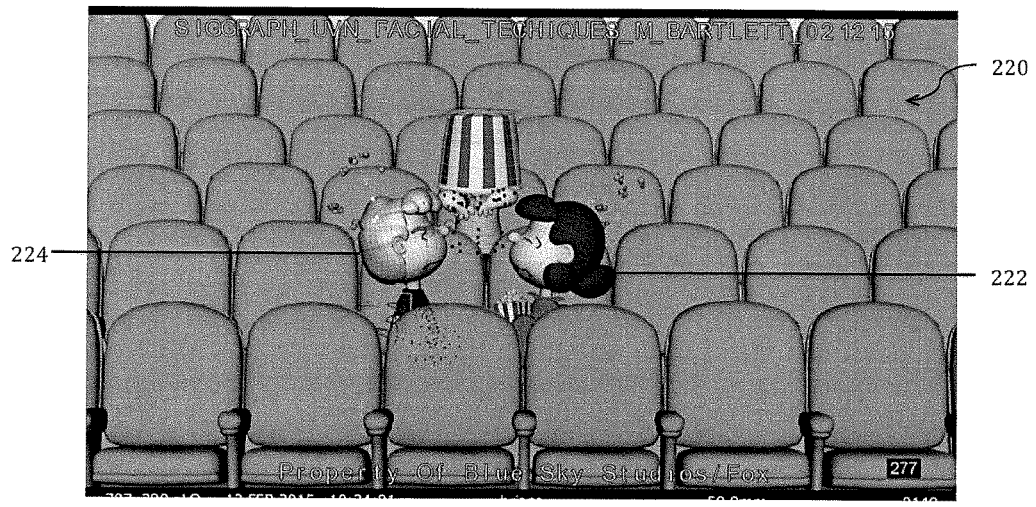
FIG. 22 illustrates a screen shot of character heads for UVN transformation.

FIG. 22 illustrates generally at 220 character heads for UVN transformation. FIGS. 23-30 illustrate a technique for sharing face rig configuration aspects between plural characters. In such technique, a detailed reference map of facial landmarks may be made for a first face (e.g., Charlie's face in FIGS. 22-30), with corresponding maps made for other characters (e.g., Lucy 222 and Schroeder 224 in FIG. 22). In exemplary embodiments, by comparing the UVN locations of Charlie's landmarks to the other kids' landmarks, the NURBS surface can be reshaped to precisely fit each kid's head shape. Once this is complete, Charlie's sculpted UVN facial expressions may be used in other character's rigs. In such a way, a single character's rig may be reshaped for some or all other characters on a show.

Figure 23:
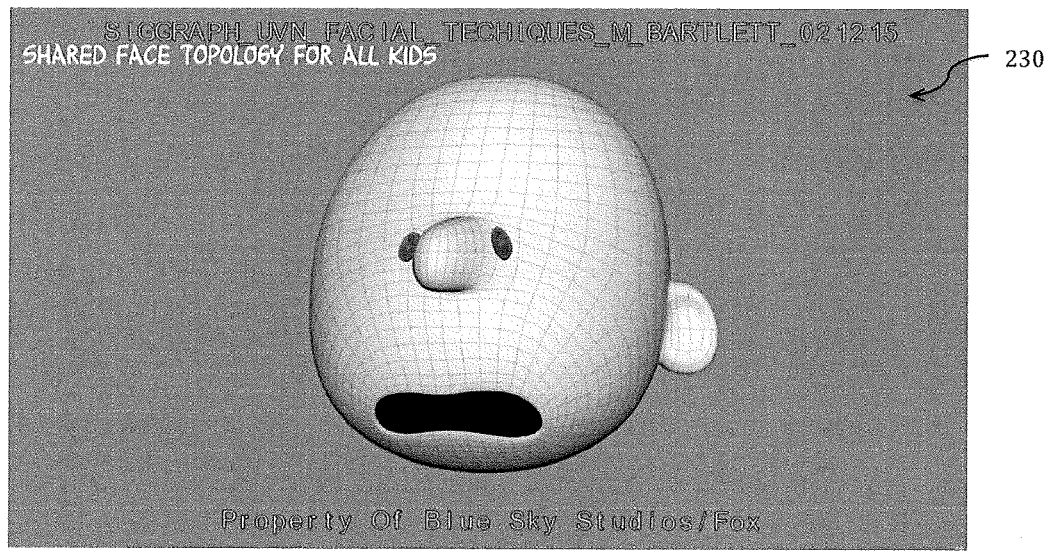
FIG. 23 illustrates a screen shot of a first exemplary face topology.
Figure 24:
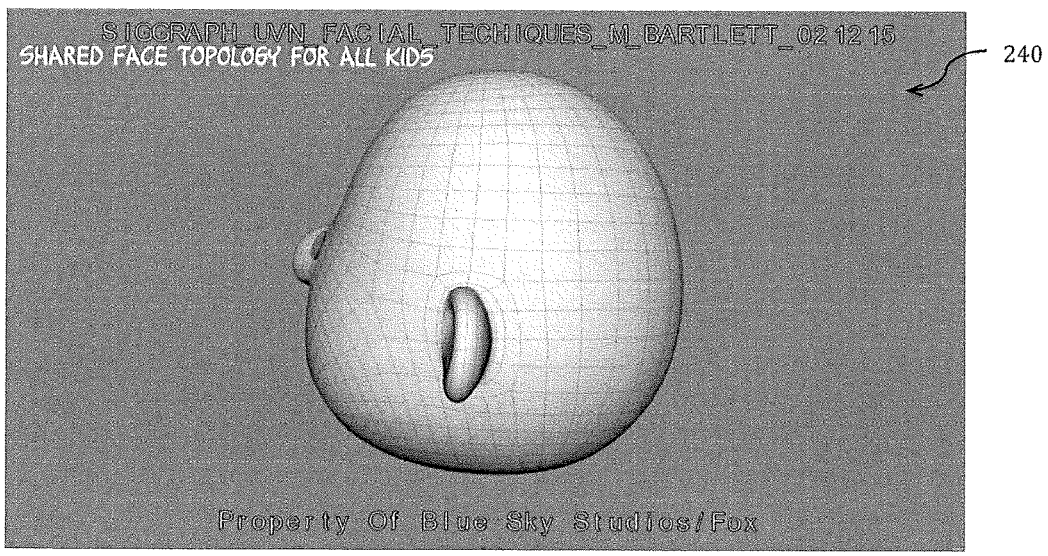
FIG. 24 illustrates a screen shot of a second exemplary face topology.
Figure 25:
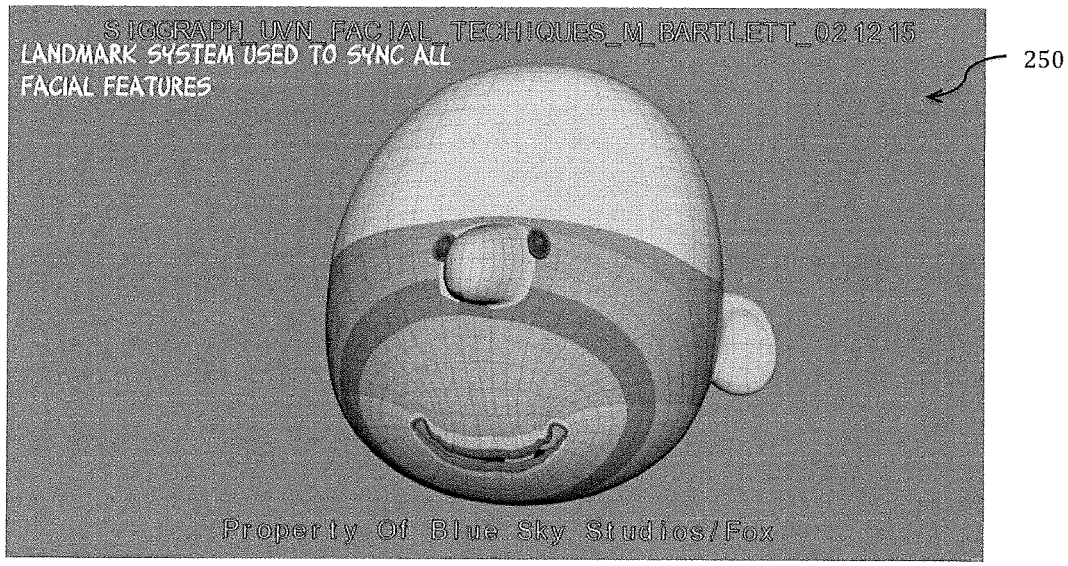
FIG. 25 illustrates a screen shot of an exemplary landmark system.
Figure 26:
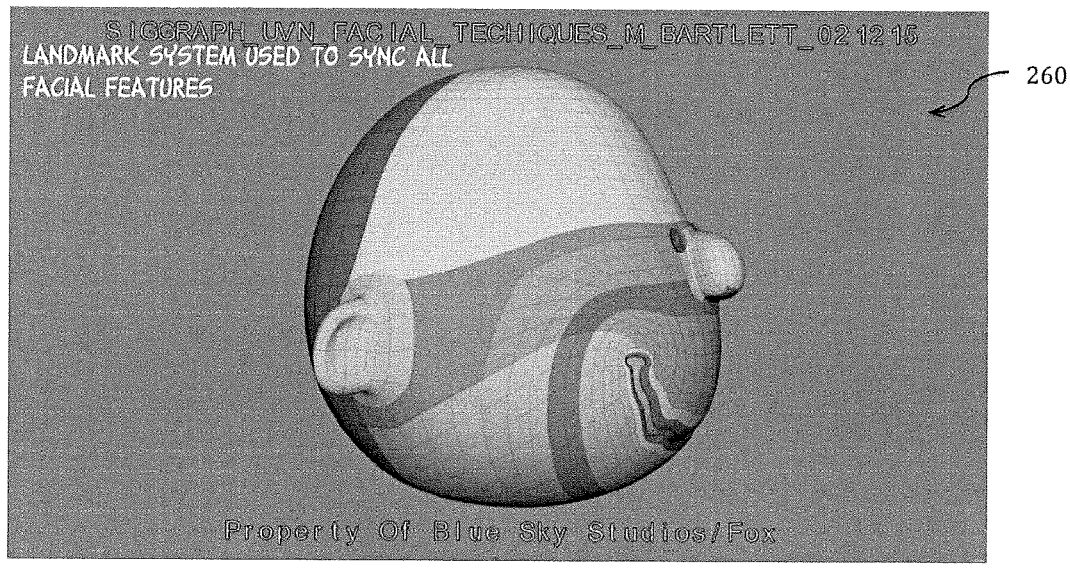
FIG. 26 illustrates a screen shot of another aspect of an exemplary landmark system.

FIG. 23 illustrates a first exemplary face topology (Charlie Brown's) generally at 230, which may be shared for other characters. FIG. 24 illustrates a second exemplary face topology (Charlie Brown's) generally at 240, which may be shared for other characters. FIG. 25 illustrates an exemplary landmark system (Charlie Brown's) generally at 250, which may be used to sync all facial features. FIG. 26 illustrates another aspect of an exemplary landmark system (Charlie Brown's) generally at 260, which may be used to sync all facial features.

Figure 27:
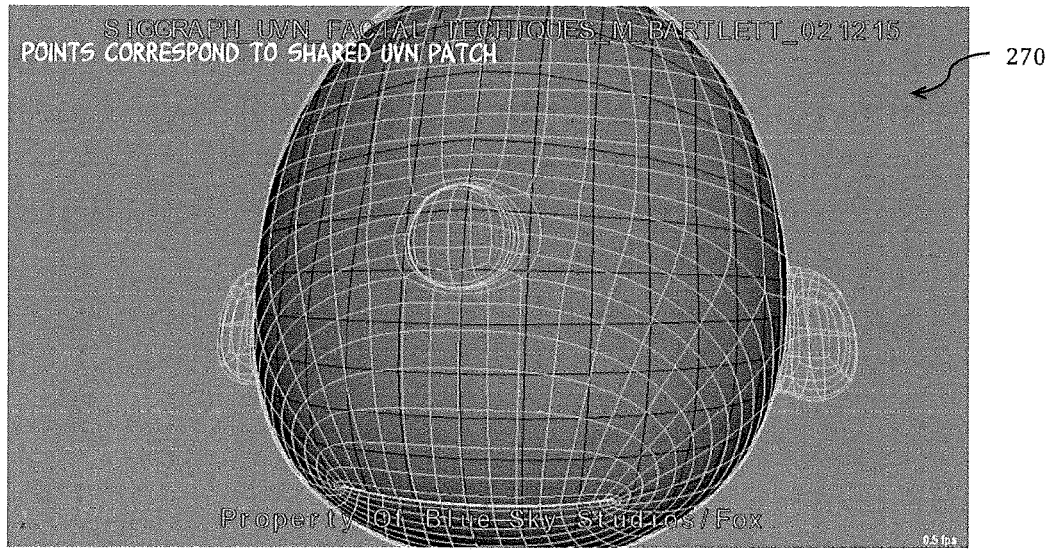
FIG. 27 illustrates a screen shot of an exemplary shared UVN patch.
Figure 28:
FIG. 28 illustrates a screen shot close-up of an exemplary shared UVN patch with illustrated points A, B and C corresponding to the shared UVN patch.

FIG. 27 illustrates an exemplary shared UVN patch (Charlie Brown's) generally at 270, which may be used to sync all facial features. FIG. 28 illustrates a close-up of an exemplary shared UVN patch (Charlie Brown's) generally at 280 with illustrated points A, B and C corresponding to the shared UVN patch, which may be used to sync all facial features.

Figure 29:
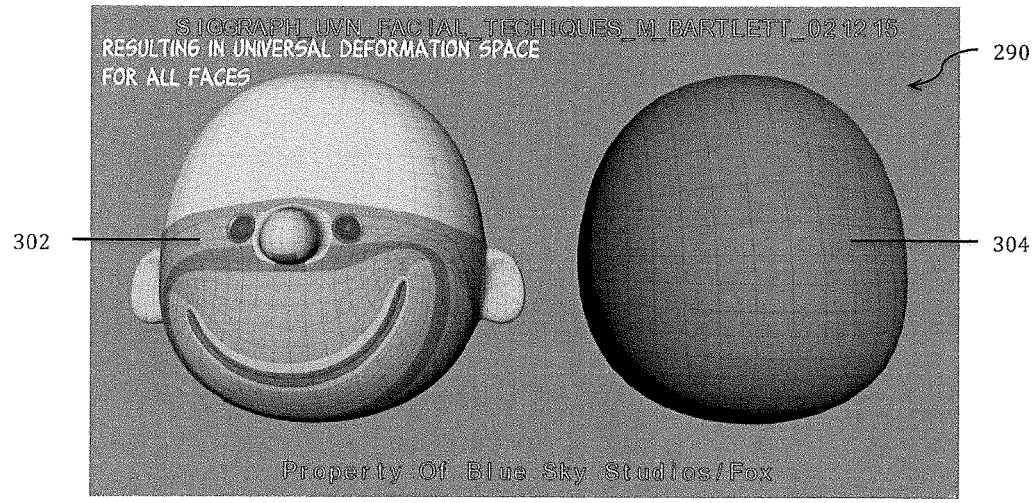
FIG. 29 illustrates a screen shot of a first exemplary result of universal deformation space for all faces.
Figure 30:
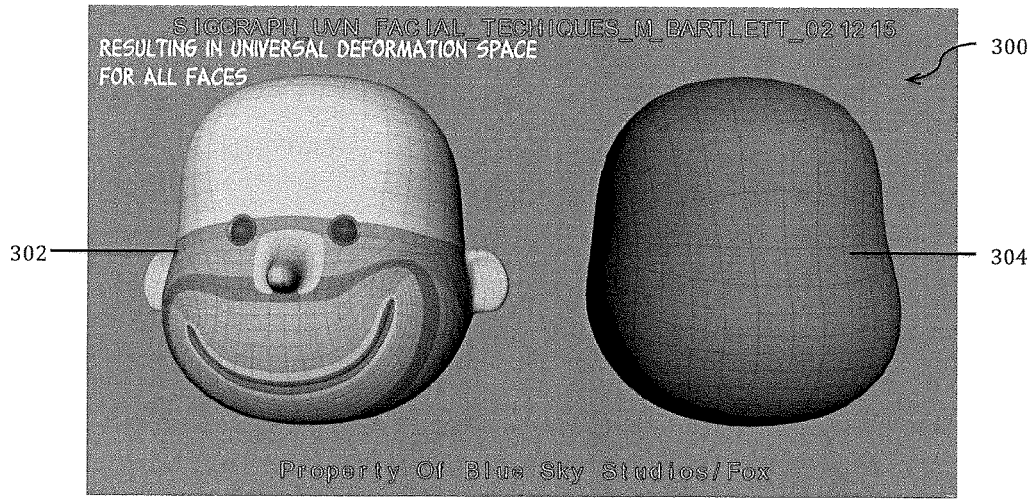
FIG. 30 illustrates a screen shot of a second exemplary result of universal deformation space for all faces.

FIG. 29 illustrates a first exemplary result of universal deformation space for all faces generally at 290, with the face illustrated at 292 and UVN space illustrated at 294. FIG. 30 illustrates a second exemplary result of universal deformation space for all faces generally at 300, with the face illustrated at 302 and UVN space illustrated at 304.

Figure 31:
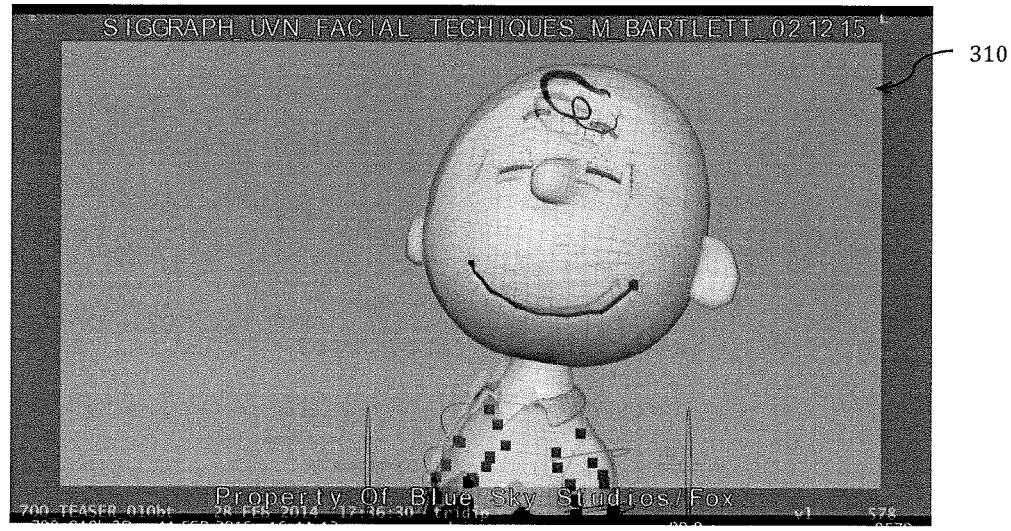
FIG. 31 illustrates a screen shot of a character head for UVN transformation.
Figure 32:
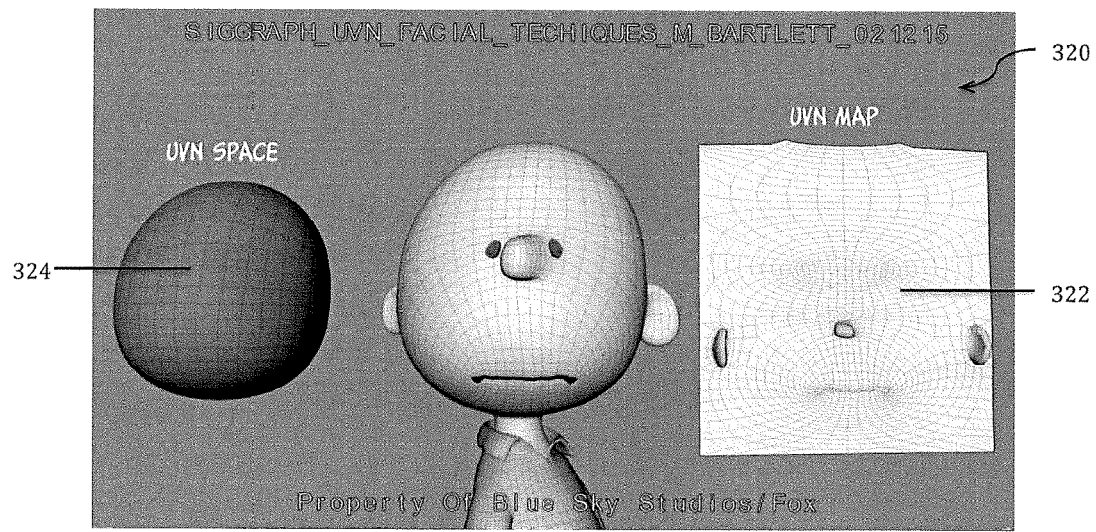
FIG. 32 illustrates a screen shot of an exemplary character in a first deformed state via UVN transformation, with corresponding UVN map and UVN space.
Figure 33:
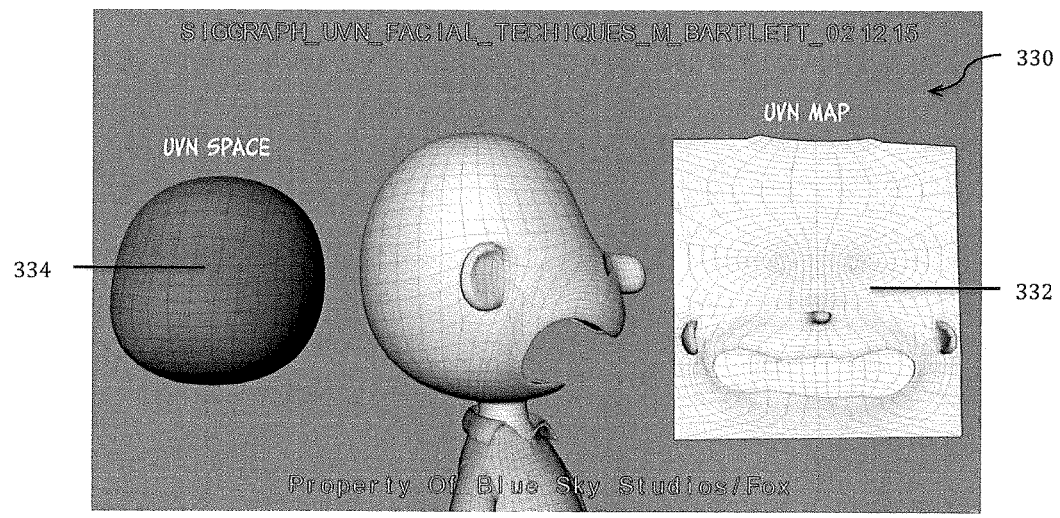
FIG. 33 illustrates a screen shot of an exemplary character in a second deformed state via UVN transformation, with corresponding UVN map and UVN space.
Figure 34:
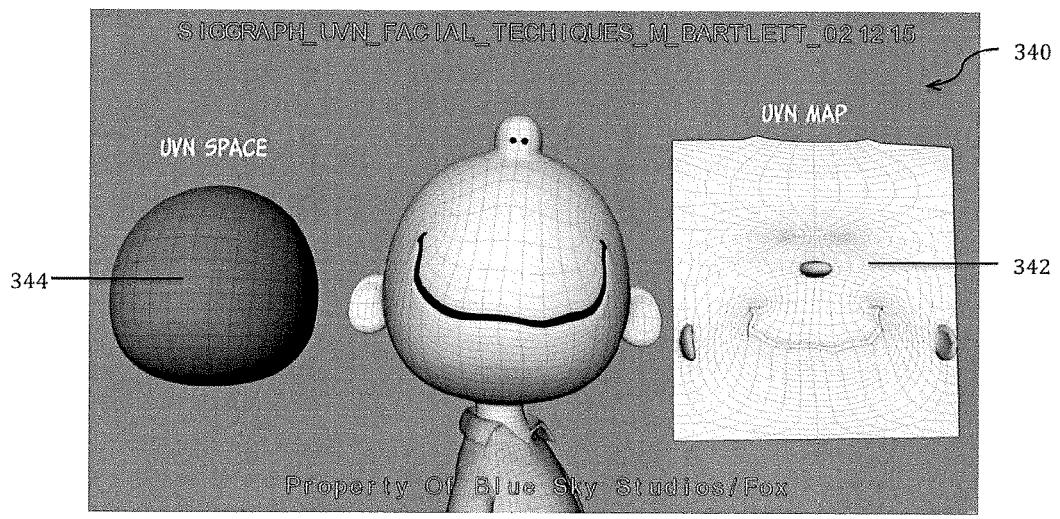
FIG. 34 illustrates a screen shot of an exemplary character in a third deformed state via UVN transformation, with corresponding UVN map and UVN space.
Figure 35:
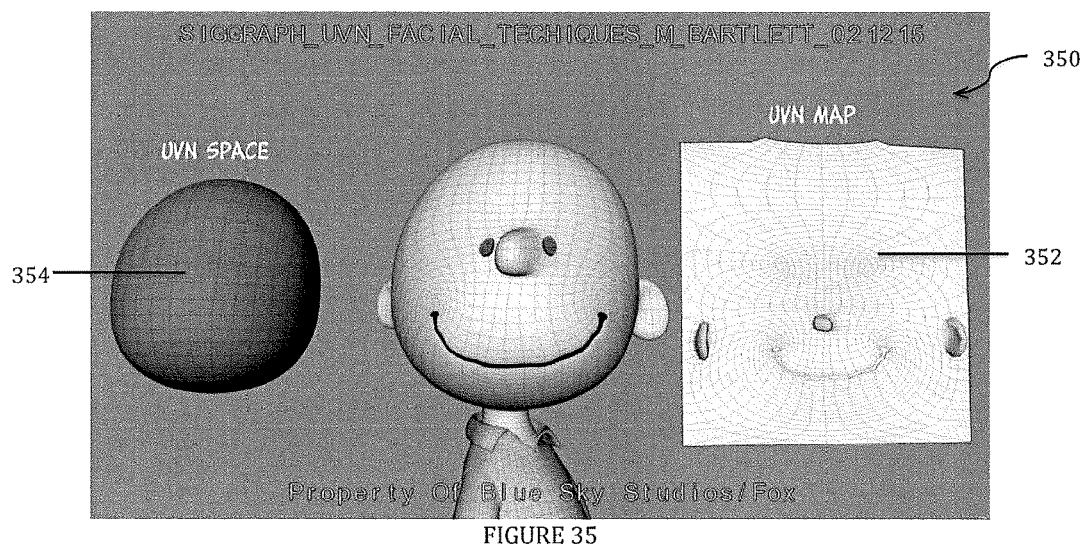
FIG. 35 illustrates a screen shot of an exemplary character in a fourth deformed state via UVN transformation, with corresponding UVN map and UVN space.

FIG. 31 illustrates generally at 310 a character head (Charlie Brown's) for UVN transformation. FIG. 32 illustrates an exemplary Charlie Brown character 320 in a first deformed state via UVN transformation, with corresponding UVN map at 322 and UVN space at 324. FIG. 33 illustrates an exemplary Charlie Brown character 330 in a second deformed state via UVN transformation, with corresponding UVN map at 332 and UVN space at 334. FIG. 34 illustrates an exemplary Charlie Brown character 340 in a third deformed state via UVN transformation, with corresponding UVN map at 342 and UVN space at 344. FIG. 35 illustrates an exemplary Charlie Brown character 350 in a fourth deformed state via UVN transformation, with corresponding UVN map at 352 and UVN space at 354.

Further, and with reference to FIGS. 2-35, determination of topology may be varied to achieve ideal results. For example, with the Charlie Brown character, exemplary embodiments utilized a mouth centered radial layout for the head mesh. Advantageously, such configuration gave that character a wide expressive range.

Additionally, the NURBS surface layout may be varied to achieve ideal results. With the Charlie Brown character, exemplary embodiments utilized a layout with an even grid in the mouth region and with the poles and seams tucked away behind the ears and under the chin. Utilizing this exemplary combination, new expressions can be sculpted directly in UVN space without changing head shape. It should be recognized that additional fine vertex adjustments may also optionally be made in Cartesian space to achieve final smoothness, e.g., to correct for any extreme compression and sheering of the mesh.

While the above Charlie Brown configurations are described above, it should be understood that those configurations are exemplary and non-limiting. For example, a configuration for Snoopy's character may be different given that character's dramatic mouth/facial changes relative to location, shape and size. In such an exemplary case, a more ideal NURBS layout may be cylindrical, with a pole on top of Snoopy's head. Additionally, head shape may be transformed (in part or completely) between expressions. In exemplary embodiments, one or both of the head mesh and the NURBS surface may be reshaped for desired poses. Deformations may be synchronized, e.g., utilizing a skin-cluster tool [Is the proprietary Id skin cluster tool a known tool, or is there a more generic term/phrase we should consider?]. Such an exemplary method can provide, for more difficult characters, more extreme range that may be needed.

Figure 36:
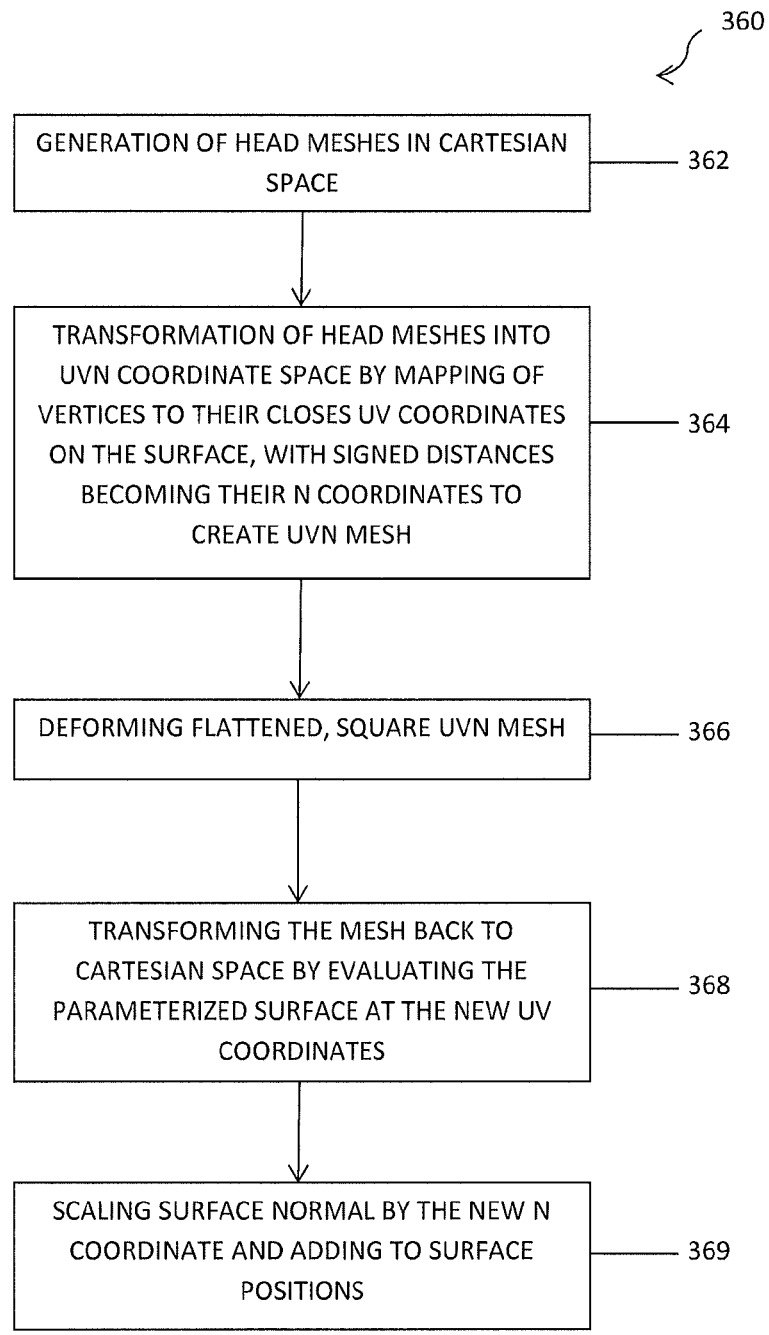
FIG. 36 illustrates a flow chart of an exemplary method in accordance with the present disclosure.

An flow chart is illustrated at FIG. 36 including an exemplary method 360 in accordance with the present disclosure, with generation of head meshes in Cartesian space at block 362, transformation of head mesh vertices into UVN coordinate space by mapping of vertices to their closest UV coordinates on the surface by mapping of vertices to their closest UV coordinates on the surface, with signed distances becoming their N coordinates to create a UVN mess at block 364, deforming flattened, square UVN mesh at block 366, transforming the mesh back to Cartesian space by evaluating the NURBS surface at the new UV coordinates at block 368, and scaling surface normal by the new N coordinate and adding to the surface positions at block 369.

In other exemplary embodiments, a system incorporating some or all of the above further includes a computer apparatus, a means for display in communication with the computer apparatus, and a means for storage in communication with the computer apparatus. The means for storage is disposed to store data representing a 3D animation, the means for display is disposed to display a representation of the 3D animation, and the computer apparatus is configured to perform a method of 3D animation.

According to yet another example embodiment of the present invention, a computer program product for 3D animation includes a tangible storage medium readable by a computer processor and storing instructions thereon that, when executed by the computer processor, direct the computer processor to perform a method in accordance with some or all of the above.

Figure 37:
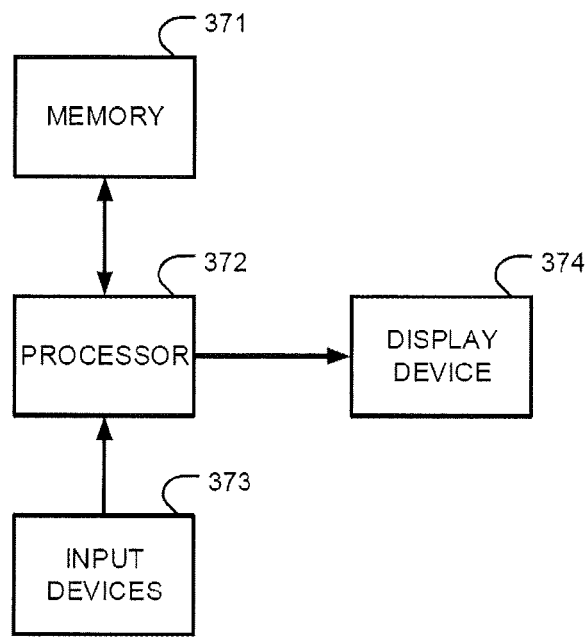
FIG. 37 depicts a computer apparatus and system for 3D animation, according to example embodiments.

As we have noted, the methodologies described hereinbefore may be implemented by a computer system or apparatus. For example, FIG. 37 illustrates a computer apparatus, according to an exemplary embodiment. Therefore, portions or the entirety of the methodologies described herein may be executed as instructions in a processor 372 of the computer system 370. The computer system 370 includes memory 371 for storage of instructions and information, input device(s) 373 for computer communication, and display device(s) 374. Thus, the present invention may be implemented, in software, for example, as any suitable computer program on a computer system somewhat similar to computer system 370. For example, a program in accordance with the present invention may be a computer program product causing a computer to execute the example methods described herein.

The computer apparatus may be any suitable computer apparatus including a server system, multi-processor system, personal computer, networked computing cluster, computing cloud, or any computer apparatus capable of practicing example embodiments.

The storage means may be any suitable storage means disposed to store information related to 3D animation. The storage means may include a single storage element, or a plurality of storage elements. The storage means may be used in combination with any storage available on the computer apparatus, or may be omitted if suitable storage is available on the computer apparatus. The storage means may include backup elements and/or recording elements. The recording elements may be disposed and configured to produce usable copies of any 3D animation produced at the computer apparatus. The usable copies are copies of a 3D animation which are viewable at a suitable apparatus. For example, a suitable apparatus may include a means for reading 3D animation data from a copy (DVD, double-reel film, recording media, etc). The suitable apparatus may also include means for displaying stereoscopic images/frames read from the 3D animation data. The displaying may include displaying left/right frames in parallel, successively, superimposed, or in any suitable fashion.

The display means may be any suitable display, including a passive, active, or auto-stereoscopic 3D display (e.g., 3D-LCD, 3D-Plasma, 3D-computer monitor, lenticular screened display, parallax barrier screened display) or a conventional display (e.g., computer monitor, LCD, plasma, etc).

Figure 38:
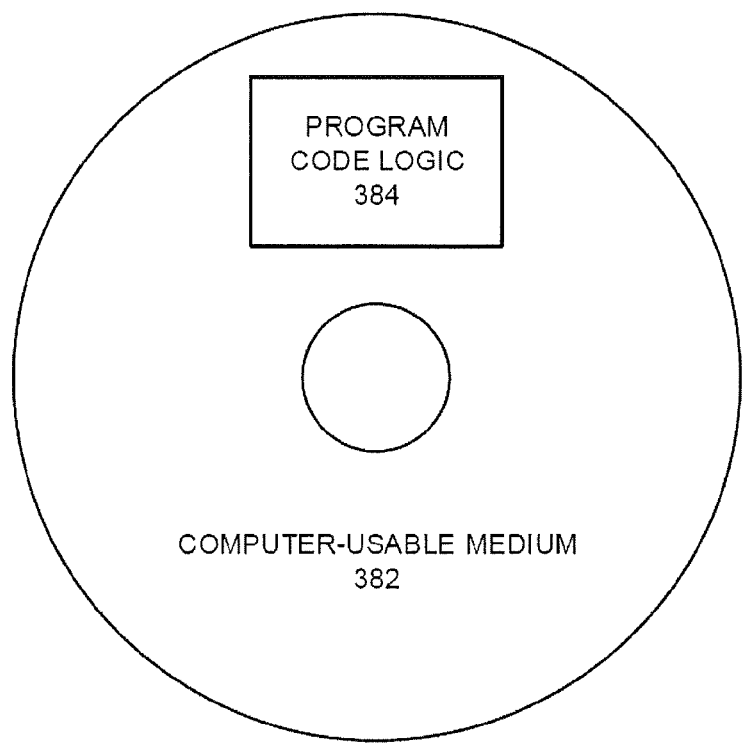
FIG. 38 depicts a computer program product, according to example embodiments.

Example embodiments may also include a computer program product 380 as depicted in FIG. 38 on a computer usable medium 382 with computer program code logic 384 containing instructions embodied in tangible media as an article of manufacture. Exemplary articles of manufacture for computer usable medium 382 may include floppy diskettes, CD-ROMs, hard drives, universal serial bus (USB) flash drives, or any other computer-readable storage medium, wherein, when the computer program code logic 384 is loaded into and executed by a computer, the computer becomes an apparatus for practicing the invention. Embodiments include computer program code logic 384, for example, whether stored in a storage medium, loaded into and/or executed by a computer, or transmitted over some transmission medium, such as over electrical wiring or cabling, through fiber optics, or via electromagnetic radiation, wherein, when the computer program code logic 384 is loaded into and executed by a computer, the computer becomes an apparatus for practicing the invention. When implemented on a general-purpose microprocessor (e.g., 372), the computer program code logic 384 segments configure the microprocessor to create specific logic circuits.

The computer-readable storage medium may be a built-in medium installed inside a computer main body or removable medium arranged so that it can be separated from the computer main body.

Further, such programs, when recorded on computer-readable storage media, may be readily stored and distributed. The storage medium, as it is read by a computer, may enable the method(s) disclosed herein, in accordance with an exemplary embodiment of the present invention.

Therefore, the methodologies and systems of example embodiments of the present invention can be implemented in hardware, software, firmware, or a combination thereof. Embodiments may be implemented in software or firmware that is stored in a memory and that is executed by a suitable instruction execution system. These systems may include any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of at least one example embodiment of the present invention in which functions may be executed out of order from that shown or discussed, including substantially concurrently or in reverse order, depending on the functionality involved, as would be understood by those reasonably skilled in the art of the present invention.

Any program which would implement functions or acts noted in the figures, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

It should be emphasized that the above-described embodiments of the present invention, particularly, any detailed discussion of particular examples, are merely possible examples of implementations, and are set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for three-dimensional (3D) animation utilizing UVN transformation, comprising:
   generation of animation character shape meshes in Cartesian space;
   transformation of animation character shape mesh vertices into UVN coordinate space by mapping of vertices to their closest UV coordinates on a surface, with signed distances becoming their N coordinates to create a UVN mesh;
   deforming said UVN mesh;
   transforming said mesh back to Cartesian space by evaluating the parameterized surface at the new UV coordinates; and
   scaling surface normal by the new N coordinate and adding to the surface positions.

2. The method in accordance with claim 1, wherein each of the vertices are transformed into UVN coordinate space.

3. The method in accordance with claim 2, wherein said transformation is performed by point projection or point inversion.

4. The method in accordance with claim 1, wherein said parameterized surface is a NURBS surface.

5. The method in accordance with claim 1, wherein said UVN mesh is a flattened, square UVN mesh.

6. The method in accordance with claim 1, wherein deforming comprises deforming by third party software and wherein said transforming comprises transforming via a plugin application.

7. The method in accordance with claim 1, wherein said animation character shape mesh is a head mesh.

8. The method in accordance with claim 1, wherein said deforming comprises linear blending.

9. The method in accordance with claim 1, wherein linear vertex translations in UVN space becomes volume preserving curved paths in Cartesian space that can be controlled by said parameterized surface.

10. The method in accordance with claim 1, wherein said parameterized surface is adjusted.

11. The method in accordance with claim 10, wherein said animation character shape mesh is a head mesh and wherein said parameterized surface is configured with a layout having an even grid in the mouth region of a character head, with poles and seams tucked away behind the ears and under the chin.

12. The method in accordance with claim 10, further comprising additional fine vertex adjustments in Cartesian space for final smoothness corrections.

13. The method in accordance with claim 10, wherein said animation character shape mesh is a head mesh and wherein said parameterized surface is configured with a layout having a cylindrical layout, with a pole on top of a character's head.

14. The method in accordance with claim 13, wherein said character's head shape is transformed between expressions.

15. The method in accordance with claim 14 wherein both the parameterized surface and the head mesh are reshaped.

16. The method in accordance with claim 15, wherein deformations are synchronized.

17. A system for three-dimensional (3D) animation utilizing UVN transformation, comprising:
    a computer processor having non-volatile memory, utilizing a 3D animation platform configured for:
    generation of animation character shape meshes in Cartesian space;
    transformation of animation character shape mesh vertices into UVN coordinate space by mapping of vertices to their closest UV coordinates on a surface, with signed distances becoming their N coordinates to create a UVN mesh;
    deforming said UVN mesh;
    transforming said mesh back to Cartesian space by evaluating the parameterized surface at the new UV coordinates; and
    scaling surface normal by the new N coordinate and adding to the surface positions.

18. The system in accordance with claim 17, wherein each of the vertices are transformed into UVN coordinate space.

19. The system in accordance with claim 18, wherein said transformation is performed by point projection or point inversion.

20. The system in accordance with claim 17, wherein said parameterized surface is a NURBS surface.

21. The system in accordance with claim 17, wherein said UVN mesh is a flattened, square UVN mesh.

22. The system in accordance with claim 17, wherein deforming comprises deforming by third party software and wherein said transforming comprises transforming via a plugin application.

23. The system in accordance with claim 22, wherein said animation character shape mesh is a head mesh.

24. The system in accordance with claim 17, wherein said deforming comprises linear blending.

25. The system in accordance with claim 17, wherein linear vertex translations in UVN space becomes volume preserving curved paths in Cartesian space that can be controlled by said parameterized surface.

26. The system in accordance with claim 17, wherein said parameterized surface is adjusted.

27. The system in accordance with claim 26, wherein said animation character shape mesh is a head mesh and wherein said parameterized surface is configured with a layout having an even grid in the mouth region of a character head, with poles and seams tucked away behind the ears and under the chin.

28. The system in accordance with claim 26, further comprising additional fine vertex adjustments in Cartesian space for final smoothness corrections.

29. The system in accordance with claim 26, wherein said animation character shape mesh is a head mesh and wherein said parameterized surface is configured with a layout having a cylindrical layout, with a pole on top of a character's head.

30. The system in accordance with claim 29, wherein said character's head shape is transformed between expressions.

31. The system in accordance with claim 30 wherein both the parameterized surface and the head mesh are reshaped.

32. The method in accordance with claim 31, wherein deformations are synchronized.

33. A computer program product for 3D animation, comprising a non-transitory, tangible storage medium readable by a computer processor and storing instructions thereon that, when executed by the computer processor, direct the computer processor to perform a method, comprising:
  generation of animation character shape meshes in Cartesian space;
  transformation of animation character shape mesh vertices into UVN coordinate space by mapping of vertices to their closest UV coordinates on a surface, with signed distances becoming their N coordinates to create a UVN mesh;
  deforming said UVN mesh;
  transforming said mesh back to Cartesian space by evaluating the parameterized surface at the new UV coordinates; and
  scaling surface normal by the new N coordinate and adding to the surface positions.

34. The product in accordance with claim 33, configured such that each of the vertices are transformed into UVN coordinate space.

35. The product in accordance with claim 34, configured such that said transformation is performed by point projection or point inversion.

36. The product in accordance with claim 33, configured such that said parameterized surface is a NURBS surface.

37. The product in accordance with claim 33, configured such that said UVN mesh is a flattened, square UVN mesh.

38. The product in accordance with claim 33, configured such that deforming comprises deforming by third party software and wherein said transforming comprises transforming via a plugin application.

39. The product in accordance with claim 38, wherein said animation character shape mesh is a head mesh.

40. The product in accordance with claim 33, configured such that said deforming comprises linear blending.

41. The product in accordance with claim 33, wherein said animation character shape mesh is a head mesh, the method further configured such that linear vertex translations in UVN space becomes volume preserving curved paths in Cartesian space that can be controlled by said parameterized surface.

42. The product in accordance with claim 33, configured such that said parameterized surface is adjusted.

43. The product in accordance with claim 42, wherein said animation character shape mesh is a head mesh, the method further configured such that said parameterized surface is configured with a layout having an even grid in the mouth region of a character head, with poles and seams tucked away behind the ears and under the chin.

44. The product in accordance with claim 42, configured such that additional fine vertex adjustments in Cartesian space for final smoothness corrections.

45. The product in accordance with claim 42, wherein said animation character shape mesh is a head mesh, the method further configured such that said parameterized surface is configured with a layout having a cylindrical layout, with a pole on top of a character's head.

46. The product in accordance with claim 45, configured such that said character's head shape is transformed between expressions.

47. The product in accordance with claim 46, configured such that both the parameterized surface and the head mesh are reshaped.

48. The product in accordance with claim 47, configured such that deformations are synchronized.

* * * * *